United States Patent [19]

Dolazza

[11] Patent Number: 4,984,286
[45] Date of Patent: Jan. 8, 1991

[54] SPATIAL FILTER SYSTEM

[75] Inventor: Enrico Dolazza, Boston, Mass.

[73] Assignee: Analogic Corporation, Peabody, Mass.

[21] Appl. No.: 448,917

[22] Filed: Dec. 12, 1989

[51] Int. Cl.$^5$ .............................................. G06K 9/36
[52] U.S. Cl. ................................. 382/54; 364/724.05; 364/724.12; 382/6
[58] Field of Search .................... 382/31, 27, 54, 6; 364/724.05, 724.12; 358/458, 455, 456, 457

[56] References Cited

U.S. PATENT DOCUMENTS

| | | | |
|---|---|---|---|
| 3,914,788 | 10/1975 | Niehaus | 358/75 |
| 4,020,463 | 4/1977 | Himmel | 382/3 |
| 4,862,403 | 8/1989 | Iwase et al. | 364/724.05 |

OTHER PUBLICATIONS

Nussbaumer, "Digital Filtering by Complex Polynomial Transforms" *IBM Tech. Disclosure Bulletin*, vol. 20, No. 9, Feb. 1978, pp. 3521-3522.

Primary Examiner—Leo H. Doudreau
Assistant Examiner—Tan Dinh
Attorney, Agent, or Firm—Joseph S. Iandiorio

[57] ABSTRACT

A digital spatial filter system includes means for separating an image formed of a matrix of pixels into four regularly distributed interleaved subimages from alternate rows and columns of the matrix pixels; means for convolving each of the four subimages with two orthogonal unidimensioanal, vectors of a convolving kernel to produce four filtered subimages; and means for recombining said convolved four filtered subimages into the original image filtered.

5 Claims, 6 Drawing Sheets

HORIZONTAL VECTOR

| | A | ∅ | B | ∅ | C | ∅ | B | ∅ | A |
|---|---|---|---|---|---|---|---|---|---|
| D | AD | ∅ | BD | ∅ | CD | ∅ | BD | ∅ | AD |
| ∅ | ∅ | ∅ | ∅ | ∅ | ∅ | ∅ | ∅ | ∅ | ∅ |
| E | AE | ∅ | BE | ∅ | CE | ∅ | BE | ∅ | AE |
| ∅ | ∅ | ∅ | ∅ | ∅ | ∅ | ∅ | ∅ | ∅ | ∅ |
| F | AF | ∅ | BF | ∅ | CF | ∅ | BF | ∅ | AF |
| ∅ | ∅ | ∅ | ∅ | ∅ | ∅ | ∅ | ∅ | ∅ | ∅ |
| E | AE | ∅ | BE | ∅ | CE | ∅ | BE | ∅ | AE |
| ∅ | ∅ | ∅ | ∅ | ∅ | ∅ | ∅ | ∅ | ∅ | ∅ |
| D | AD | ∅ | BD | ∅ | CD | ∅ | BD | ∅ | AD |

VERTICAL VECTOR

*Fig. 2*

| | | $C_1$ | $C_2$ | $C_3$ | $C_4$ | $C_5$ | $C_6$ | $C_7$ | $C_8$ | $C_9$ | $C_{10}$ | $C_{11}$ | $C_{12}$ | $C_{13}$ | VIDEO FIELD |
|---|---|---|---|---|---|---|---|---|---|---|---|---|---|---|---|
| | | J-6 | J-5 | J-4 | J-3 | J-2 | J-1 | J | J+1 | J+2 | J+3 | J+4 | J+5 | J+6 | |
| $R_1$ | K-5 | $I_3$ | $I_4$ | $I_3$ | $I_4$ | $I_3$ | $I_4$ | $I_3$ | $I_4$ | $I_3$ | $I_4$ | $I_3$ | $I_4$ | $I_3$ | 1° |
| $R_2$ | K-4 | $I_1$ | $I_2$ | $I_1$ | $I_2$ | $I_1$ | $I_2$ | $I_1$ | $I_2$ | $I_1$ | $I_2$ | $I_1$ | $I_2$ | $I_1$ | 2° |
| $R_3$ | K-3 | $I_3$ | $I_4$ | $I_3$ | $I_4$ | $I_3$ | $I_4$ | $I_3$ | $I_4$ | $I_3$ | $I_4$ | $I_3$ | $I_4$ | $I_3$ | 1° |
| $R_4$ | K-2 | $I_1$ | $I_2$ | $I_1$ | $I_2$ | $I_1$ | $I_2$ | $I_1$ | $I_2$ | $I_1$ | $I_2$ | $I_1$ | $I_2$ | $I_1$ | 2° |
| $R_5$ | K-1 | $I_3$ | $I_4$ | $I_3$ | $I_4$ | $I_3$ | $I_4$ | $I_3$ | $I_4$ | $I_3$ | $I_4$ | $I_3$ | $I_4$ | $I_3$ | 1° |
| $R_6$ | K | $I_1$ | $I_2$ | $I_1$ | $I_2$ | $I_1$ | $I_2$ | $I_1$ | $I_2$ | $I_1$ | $I_2$ | $I_1$ | $I_2$ | $I_1$ | 2° |
| $R_7$ | K+1 | $I_3$ | $I_4$ | $I_3$ | $I_4$ | $I_3$ | $I_4$ | $I_3$ | $I_4$ | $I_3$ | $I_4$ | $I_3$ | $I_4$ | $I_3$ | 1° |
| $R_8$ | K+2 | $I_1$ | $I_2$ | $I_1$ | $I_2$ | $I_1$ | $I_2$ | $I_1$ | $I_2$ | $I_1$ | $I_2$ | $I_1$ | $I_2$ | $I_1$ | 2° |
| $R_9$ | K+3 | $I_3$ | $I_4$ | $I_3$ | $I_4$ | $I_3$ | $I_4$ | $I_3$ | $I_4$ | $I_3$ | $I_4$ | $I_3$ | $I_4$ | $I_3$ | 1° |
| $R_{10}$ | K+4 | $I_1$ | $I_2$ | $I_1$ | $I_2$ | $I_1$ | $I_2$ | $I_1$ | $I_2$ | $I_1$ | $I_2$ | $I_1$ | $I_2$ | $I_1$ | 2° |
| $R_{11}$ | K+5 | $I_3$ | $I_4$ | $I_3$ | $I_4$ | $I_3$ | $I_4$ | $I_3$ | $I_4$ | $I_3$ | $I_4$ | $I_3$ | $I_4$ | $I_3$ | 1° |

Fig. 3

SPATIAL FILTER SYSTEM

FIELD OF INVENTION

This invention relates to spatial filtering in information processing, and more particularly to digital spatial filtering in image processing by separating a full image into four interleaved images for separate filtering and recombination.

BACKGROUND OF INVENTION

Typically images to be digitally filtered such as those occurring in medical diagnostic applications, are digitized images in a matrix of, for example, 1024 by 1024 pixels. For this as well as for other applications, the main purpose of the filtering is to enhance generally uniformly the frequency components above a predetermined frequency. Digital filtering of these images is typically accomplished using relatively large convolving kernels, e.g., kernels of up to 127 by 127. Thus real time spatial filtering requires $1024 \times 1024 \times 127 \times 127 \times 30$, or approximately $5.07 \times 10^{11}$ multiplications and approximately $5.07 \times 10^{11}$ additions per second, where 30 represents the number of frames per second in video reproduction. This burden can be reduced somewhat where the matrix $N \times M$ representing the convolving kernel can be factored into the outer product of two vectors of N and M coefficients. In this way the two-dimensional filtering process can be decomposed in the sequence of two orthogonal unidimensional processes and the total number of operations can be reduced by the factor $N \times M/(N+M)$. This substantially reduces the number of multiplications per second and of additions per second from $5.07 \times 10^{11}$ to $7.99 \times 10^{9}$, for the case of the example above.

In addition, typically a digital filter is implemented using pipeline techniques which effects another problem. For real time video applications the pipeline must operate at video rate. Thus for an image matrix of 1024 by 1024 pixels the pipeline must operate at a rate close to 40 MHz: each operation performed in a pipeline stage must be completed in 25 nanoseconds. Considering typical time overheads associated with pipeline processing: propagation time, hold time of the clock registers, clock skew, and the like which can use 15 nanoseconds or more, the actual time available to perform an operation at any given stage is reduced to approximately less than 10 nanoseconds. This amount of time available per stage is extremely short to process data, specifically when the dynamic range of intermediate data is increased significantly above that of the original data due to the filtering algorithm and implementation.

In video real time applications the image is typically provided in two separate video fields whose lines, although adjacent in space, are separated in time by the period of one video field. In this environment the interlaced image must be scan converted before it is filtered. And after filtration the image must be once again arranged in its original interlaced sequence. All these scan conversions, forward and reverse, require additional image memories of substantial size.

If the video image to be digitally filtered is provided fully in one field rather than in two interleaved fields, the refresh period increases from 1/30 of a second to 1/60 of a second and the filter pipeline rate now approaches 80 MHz instead of 40 MHz, thereby decreasing even further the amount of time available for each operation stage from less than 10 nanoseconds to unattainably short times.

SUMMARY OF INVENTION

It is therefore an object of this invention to provide an improved digital spatial filtering technique where the filter enhances generally uniformly the frequency components above a predetermined frequency, which filter substantially reduces the number of operations required without decreasing the size of the convolving kernel.

It is a further object of this invention to provide such a digital spatial filtering technique which operates at lower rates and provides more time for individual operations.

It is a further object of this invention to provide such a digital spatial filtering technique which operates at lower rates and requires no scan conversions.

It is a further object of this invention to provide such a spatial filtering technique which permits pipeline operation rate at half or even a quarter of the data input rate.

It is a further object of this invention to provide such a digital spatial filtering technique which permits improved control over the low/medium frequency response.

It is a further object of this invention to provide such a digital spatial filtering technique which reduces the number of operations by a factor of four.

The invention results from the realization that truly effective digital spatial filtering for enhancing generally uniformly the frequency components above a predetermined frequency can be achieved by separating a full digitized image into four separate interleaved images for digital filtering and recombination by virtually performing a spatial filtering of the full digital image using two orthogonal, unidimensional, bidirectional, convolving kernels whose odd coefficients are set to zero.

This invention features a digital spatial filter system which includes means for separating an image formed of a matrix of pixels into four regularly distributed interleaved subimages from alternate rows and columns of the matrix pixels. There are means for convolving each of the four subimages with two orthogonal unidimensional vectors of a convolving kernel to produce four filtered subimages. There are also means for recombining the convolved four filtered subimages into the original image filtered.

In a preferred embodiment the means for separating includes means for segregating pixels of alternate rows and means for segregating pixels of alternate columns to produce the four subimages. The means for segregating may include means for splitting the image into alternate rows of pixels, and means for dividing the pixels in alternate rows into alternate columns. Alternatively, the means for segregating may include means for splitting the image into alternate columns of pixels and means for dividing the pixels in alternate columns into alternate rows. The means for convolving is non-recursive.

DISCLOSURE OF PREFERRED EMBODIMENT

Other objects, features and advantages will occur to those skilled in the art from the following description of a preferred embodiment and the accompanying drawings, in which:

FIG. 2 is an illustration of a simplified, two-dimensional, decomposable convolving kernel, whose horizontal and vertical generating vectors have the odd coefficients set to zero in accordance with this invention;

FIG. 3 illustrates a digital image formed of a matrix of pixels arranged to show the four different subimages interleaved and regularly distributed between alternate rows and columns;

The accomplishment of this invention by virtually setting alternate coefficients to zero (hereinafter simply called "odd" coefficients) can be seen from an example where a symmetrical kernel has a linear size of 4n+1 where alternate coefficients, are set to zero:

$$a_n, 0, \ldots, 0, a_2, 0, a_1, 0, a_o, 0, a_1, 0, \ldots a_n \quad (1)$$

A unidimensional sequence of samples defined at an interval Δ when convolved with the kernel defined in (1) is filtered with a filter whose frequency spectrum $F(\omega)$ is stated:

$$F(\omega) = a_o + 2a_1 \cos(2\omega\Delta) + 2a_2\cos(4\omega\Delta) + \ldots 2a_n\cos(2n\omega\Delta) \quad (2)$$

In comparison, the linear kernel of 2n+1 coefficient obtained without the zero odd coefficients appears as:

$$a_n, a_{n-1}, \ldots a_2, a_1, a_o, a_1, \ldots a_n \quad (3)$$

and generates the frequency spectrum $F'(\omega)$ as follows:

$$F'(\omega) = a_o + 2a_1 \cos(\omega\Delta) + 2a_2 \cos(2\omega\Delta) + \ldots + 2a_n \cos(h\omega\Delta) \quad (4)$$

Figure 1:
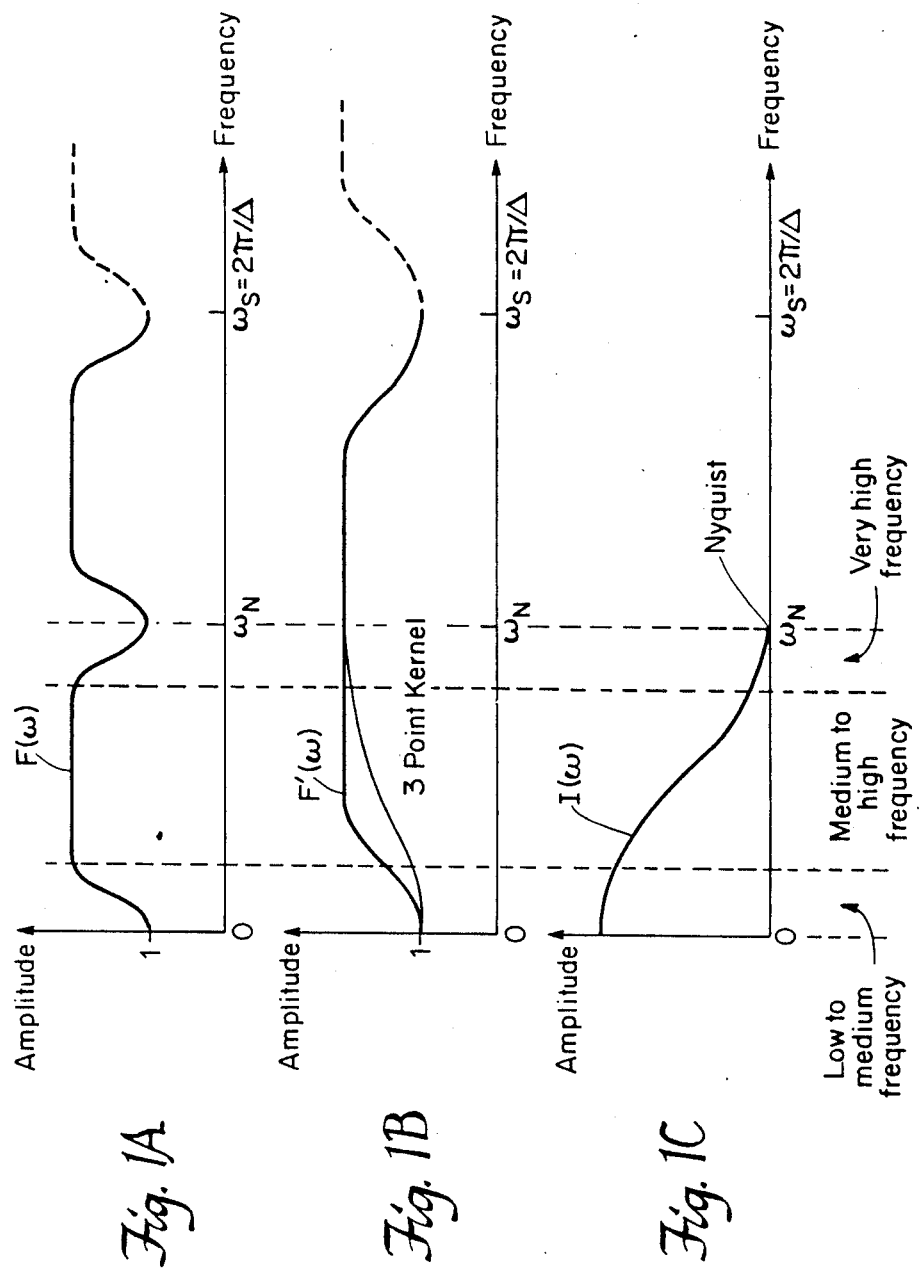
FIG. 1A is a graphical illustration of the frequency spectrum $F(\omega)$ of the digital filter according to this invention which is performed by a kernel that has n non-zero coefficients defined at an interval 2Δ so that its odd coefficients are set equal to zero.
FIG. 1B is the frequency spectrum $F'(\omega)$ of a digital filter which is performed by a kernel that has the same n non-zero coefficients defined at an interval $\alpha$.
FIG. 1C is the frequency response $I(\omega)$ of one of the two orthogonal sets of frequencies typically present in a digitized diagnostic image.

As illustrated in FIG. 1A, the frequency response $F(\omega)$ is essentially the same as response $F'(2\omega)$ and therefore the frequency spectrum of $F(\omega)$ can be easily derived from $F'(\omega)$, FIG. 1B, with proper rescaling (2:1) of the frequency axis. Notice that in the frequency domain, $F(\omega) = F'(2\omega)$ and therefore the frequency spectrum of $F(\omega)$ can be easily derived by $F'(\omega)$ with proper rescaling of the frequency axis.

More specifically, the digital filter $F'(\omega)$ has a periodic frequency response that can be fully defined by its behavior in the frequency interval $0 \leq \omega \leq 2\pi/\Delta$, whereas the digital filter $F(\omega)$ has a periodical frequency response that can be fully defined in the frequency interval $0 \leq \omega \leq \pi/\Delta$.

In addition, because in most imaging cases the kernel is symmetrical, it occurs that $F(\omega) = F(\pi/\Delta - \omega)$.

FIGS. 1A and B show that $F(\omega)$ and $F'(\omega)$ are both designed with the purpose of enhancing generally uniformly the high frequencies beyond a predetermined frequency, as typically desirable in diagnostic imaging; FIG. 1C shows the typical spectrum of one, $I(\omega)$, of the two orthogonal sets of frequencies typically present in a digitized diagnostic image whose frequency components close to the Nyquist frequency are practically completely attenuated because of the point spread function of the x-ray/optical chain and the digitization matrix typically chosen.

The responses $F(\omega)$, $F'(\omega)$ and $I(\omega)$ also illustrate that the medium/high frequencies actually present in the image are identically enhanced by $F'(\omega)$ and $F(\omega)$.

The low/medium frequencies of the image are enhanced more by $F(\omega)$ than by $F'(\omega)$, because of the larger kernel size of the former. More specifically, the enhancement of the low/medium image frequencies equivalent to that provided by the filter $F(\omega)$, could be obtained using a filter that has no zero terms only if it has twice the number of non-zero coefficients.

The lack of enhancement of the very high frequencies close to the Nyquist frequency does not affect the diagnostic quality of the digitally filtered image but it has the positive effect of preventing the enhancement of the high frequency noise introduced by the TV camera, as well as other noise sources, not prefiltered by point spread function of the x-ray/optical chain.

As taught by this invention, when a digital diagnostic image should be filtered for enhancement of its medium/high frequency components, using a large size convolving kernel, significant computational and architectural advantages can be obtained by separating the full image into four separate, interleaved images by virtually (or actually) using a convolving kernel whose odd coefficients are set to zero.

The first advantage is a computational one. Given the spectrum of frequencies to be enhanced, and therefore given the overall size of the convolving kernel, the overall number of operations to perform is reduced by a factor of 4, when the proposed unidimensional kernel is applied to both the horizontal and vertical frequencies of the image.

As a second point, when the odd coefficients are set to zero in the horizontal and vertical matrix vectors, the kernel matrix 14 appears as shown in the simplified example of FIG. 2, with all non-zero coefficients surrounded by zero coefficients. When this kernel is applied to a matrix of pixels which constitute an image to be filtered, the result is a filtered image where the structure of the zero coefficients in the two-dimensional convolving kernel is such that the pixel $P_{J,K}$ (of the Jth column and of the Kth row) is in practice convolved only with the pixels of the type $P_{J+2n,K+2n}$, that is, with pixels that are located 2, 4, 6, ... columns and rows apart. Thus the image to be filtered can be decomposed into four images $I_1, I_2, I_3, I_4$ whose pixels are regularly interleaved into the image I, as shown at 16 in FIG. 3. The result is as if each one of the four images $I_1, I_2, I_3, I_4$ is independently convolved with a two-dimensional kernel that is the outer product of two unidimensional kernels which are related to the unidimensional kernel here proposed as (3) is related to (1), that is, with the odd coefficients set to zero removed and the kernel size consistently shrunk, the odd coefficients are set to zero.

This leads to significant simplification of the architecture of the hardware that implements the digital spatial filter according to this invention. One simplification comes from the fact that a video field of an interlaced image contains all and only the pixels of the image $I_1$ and of the image $I_2$, whereas the other video field contains all and only the pixels of the image $I_3$ and of the image $I_4$. Therefore the present invention allows spatial filtering of the two video fields of the image independently from each other, thus eliminating the need for temporary image storage related to scan conversion. Another simplification is related to the fact that the pixels of each image line alternatively belong either to the images $I_1$ and $I_2$ (for one video field) or to the images $I_3$ and $I_4$ (for the other video field). Therefore, because $I_1$ and $I_2$ (or $I_3$ and $I_4$) can be filtered independently, the odd and the even pixels of each line can be independently convolved. As a result of this, unidimensional convolution algorithms can be implemented at video rates with the 40 MHz pipeline replaced by two independent 20 MHz pipelines, working in parallel, one on the odd pixels of the lines of the active field, the other on the even pixels of the lines of the same active field.

In addition, since both the rows and columns are independently treatable when unidimensionally convolved, the processing rate can be reduced again by a factor of two for non-interleaved (or progressive) video images with a period of 1/60 of a second and data rates approaching 80 MHz, can be accommodated using four filter circuits in parallel, each working at 20 MHz.

Figure 4:
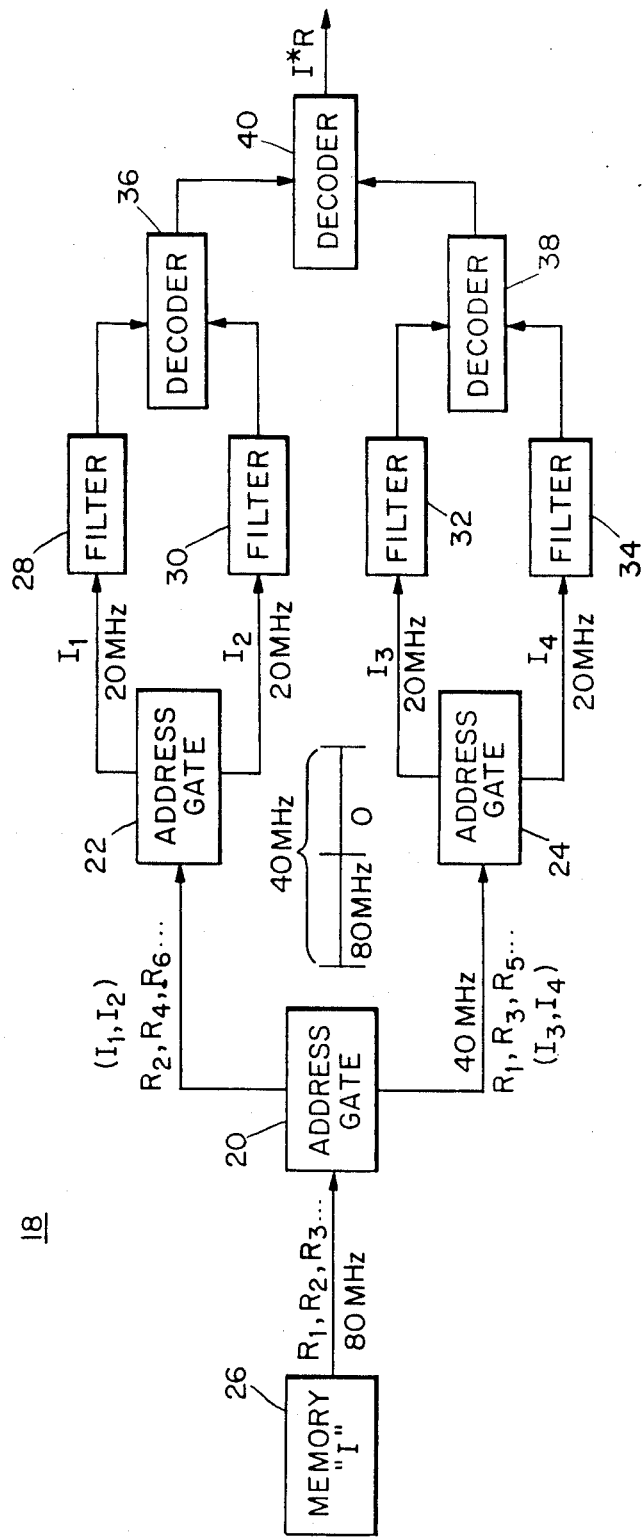
FIG. 4 is a schematic block diagram of the filter system according to this invention in which an image is split first into alternate rows, after which each of the rows is split into alternate columns.

The invention may be implemented with a digital filter system 18 having a series of address gates 20, 22, 24, FIG. 4, which separate the two digitized interlaced video fields and then separate each of those digitized video fields to produce four independent digital interleaved images. Memory 26 has a digital image stored in it which may be perceived in the same form or split as in digital image 16 in FIG. 3. Memory 26 is read out row by row, $R_1$, $R_2$, $R_3$, $R_4$, ... to address gate 20. Address gate 20 routes the pixel values of even rows $R_2$, $R_4$, $R_6$, ... (interlaced order field 1) to a second address gate 22 and routes the pixel values of odd rows, $R_1$, $R_3$, $R_5$, ... (interlaced image 2) to a third address gate 24. Thus address gate 22 receives only pixel values $I_1$ and $I_2$ while address gate receives only pixel values $I_3$ and $I_4$. Address gate 22 separates $I_1$ and $I_2$; address gate 24 separates $I_3$ and $I_4$. Each of the $I_1$, $I_2$, $I_3$ and $I_4$ values is then directed to a spatial filter 28, 30, 32, 34 after which the filtered images $I_1^*$, $I_2^*$ are recombined by decoder 36 and filtered images $I_3^*$, $I_4^*$ are recombined by decoder 38 and each of those combined filtered images are combined by decoder 40 into a complete filtered image $I^*$ of the original image $I$ in memory 26. And even though filtered images $I_1^*$, $I_2^*$ $I_3^*$, $I_4^*$ contain aliasing artifacts, those aliases are eliminated in the recombination and are absent in the final image $I^*$. Another advantage is that an 80 MHz signal from memory 26 is split into two 40 MHz signals at gate 20, each of which is split into two 20 MHz signals by gates 22 and 24 so that filters 28, 30, 32, 34 need only process at a comfortable 20 MHz rate.

Figure 5:
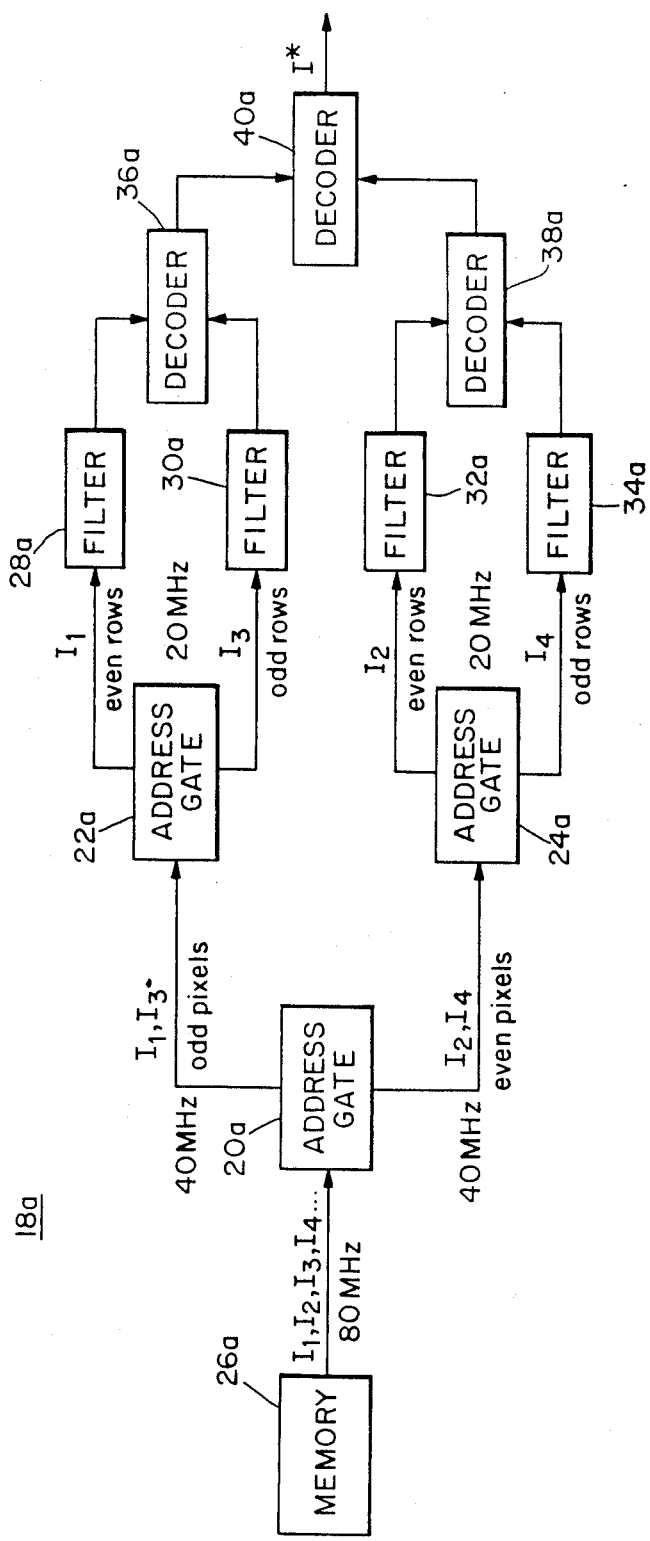
FIG. 5 is a view similar to FIG. 4 wherein the image pixels are separated first into alternate columns and then into alternate rows.

Although gates 22, 24 receive data at the rate of 40 MHz, that is really only an average: since each row contains data at 80 MHz and only every second row is directed to gates 22, 24, the average is 40 MHz but the data in each row that is processed is occurring at 80 MHz with 50% duty cycle, thus requiring a line buffer to average the data rate. This can be reduced and the line buffer eliminated by inverting the separators of rows and pixel data. The image in memory 26a, FIG. 5, is read out to address gate 20 directly in pixel values $I_1$, $I_2$, $I_3$, $I_4$, which separates them into odd pixels $I_1$, $I_3$ and even pixels $I_2$, $I_4$. Address gates 22a and 24a then separate them into even rows $R_2$, $R_4$, ... and odd rows $R_1$, $R_3$, ..., after which the images are filtered and recombined as before.

Figure 6:
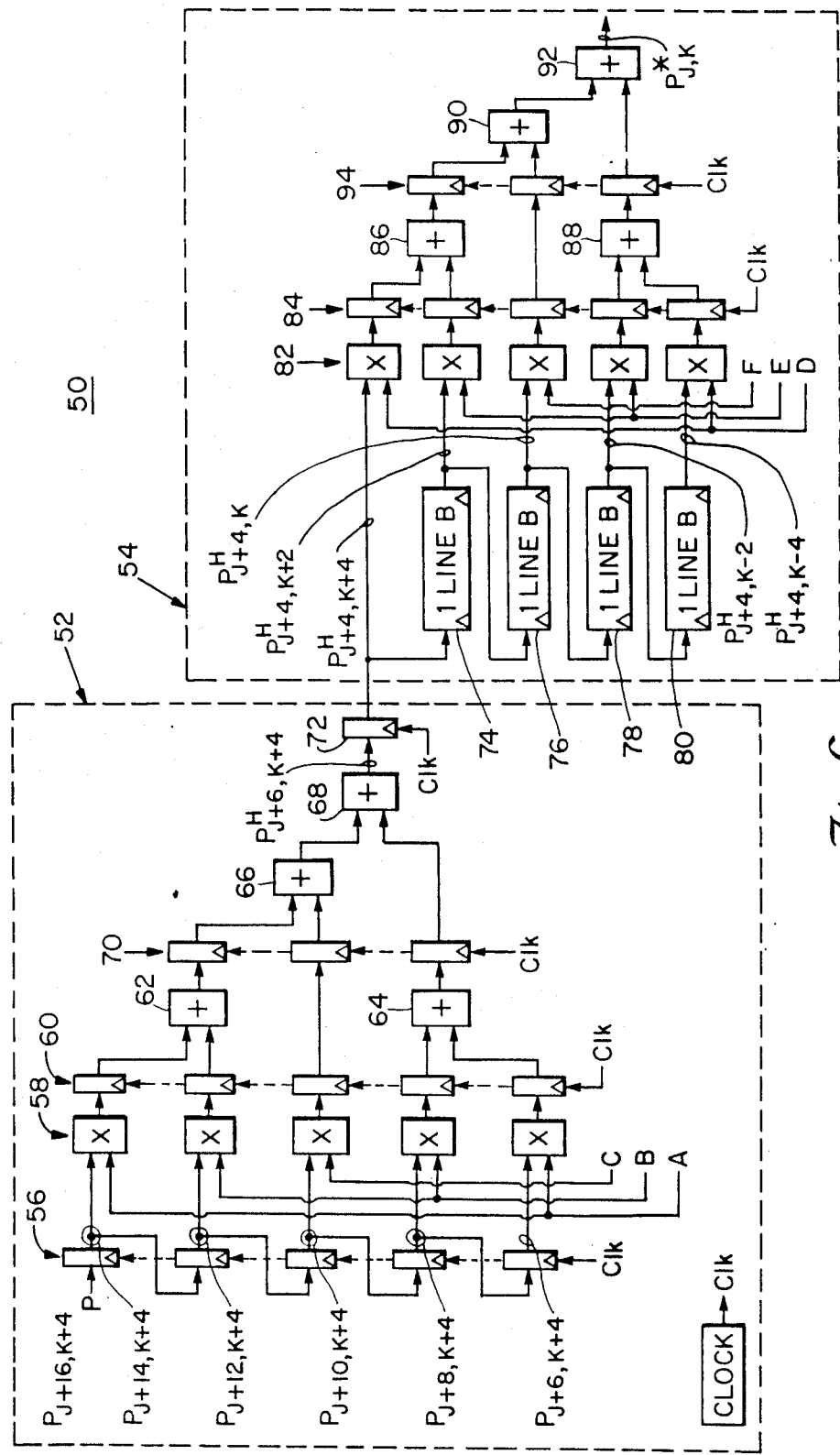
FIG. 6 is a schematic block diagram of a filter which may be used in the systems shown in FIGS. 4 and 5.

Filters 28, 30, 32, 34 may be implemented by a two-dimensional filter 50, FIG. 6, that convolves one of the subimages $I_1$, $I_2$, $I_3$, $I_4$ specifically for subimage $I1$ of FIG. 3, with the two-dimensional kernel of FIG. 2.

Filter 50 comprises two stages 52 and 54. In stage 52 the pixels of the row $R+4$ of subimage $I_1$ are convolved with the horizontal vector [A, B, C, B, A], derived from the horizontal vector 10 of FIG. 2, removing the interleaved zero coefficients. In FIG. 6, the pixels to be horizontally convolved are $P_{J+14, K+4}$, $P_{J+12, K+4}$, $P_{J+10, K+4}$, $P_{J+8, K+4}$, $P_{J+6, K+4}$, output by the first set of registers 56. As the set of registers 56 is clocked, the pixels to be horizontally convolved shift one step within the subimage $I_1$, or two steps within the image $I$.

Following this the pixel values are multiplied in multiplier 58 by coefficient A, B and C then propagated through register 60 and submitted to two stage of summing in adders 62, 64 and 66, 68, interconnected through register 70. The horizontally convolved or filtered pixel $P^H_{J+6, K+4}$ appears at the output of adder 68. After a delay introduced by register 72 the horizontally filtered pixels are fed to the next stage 54.

In stage 54 the horizontally convolved pixels are shifted through delay lines 74, 76, 78, 80 to simultaneously present pixel values one line apart, $P^H_{J+4, K+4}$, $P^H_{J+4, K+2}$, $P^H_{J+4, K}$, $P^H_{J+4, K-2}$, $P^H_{J+4, K-4}$. These values are multiplied by coefficients D, E, F in multipliers 82 and presented to register 84, after which they are summed in adders 86, 88 and then adders 90, 92 interconnected by register 94 to produce the final filtered or convolved pixel value $P^*_{J, K}$.

Although specific features of the invention are shown in some drawings and not others, this is for convenience only as each feature may be combined with any or all of the other features in accordance with the invention.

Other embodiments will occur to those skilled in the art and are within the following claims:

What is claimed is:

1. A digital spatial filter system comprising:
    means for separating a digital image formed of a matrix of pixels into four regularly distributed interleaved subimages from alternate rows and columns of the matrix pixels;
    means for convolving each of said four digital subimages with two orthogonal, unidimensional vectors of a convolving kernel to produce four digitally filtered subimages; and
    means for recombining said convolved four filtered digital subimages into the original image digitally filtered.

2. The filter system of claim 1 in which said means for separating includes means for segregating pixels of alternate rows and means for segregating pixels of alternate columns to produce said four subimages.

3. The filter system of claim 2 in which said means for segregating includes means for splitting said image into alternate rows of pixels and means for dividing the pixels in alternate rows into alternate columns.

4. The filter system of claim 2 in which said means for segregating includes means for splitting said image into alternate columns of pixels and means for dividing the pixels in alternate columns into alternate rows.

5. The filter system of claim 1 in which said means for convolving is non-recursive.

* * * * *